United States Patent [19]

Tsuruoka

[11] 4,099,190
[45] Jul. 4, 1978

[54] INDICATION DEVICE IN VIEWFINDER FOR A SINGLE LENS REFLEX CAMERA

[75] Inventor: Tomio Tsuruoka, Tokyo, Japan

[73] Assignee: Nippon Kogaku K.K., Tokyo, Japan

[21] Appl. No.: 742,065

[22] Filed: Nov. 15, 1976

[30] Foreign Application Priority Data

Nov. 19, 1975 [JP] Japan .................. 50-156230[U]

[51] Int. Cl.$^2$ .................. G03B 13/02; G03B 17/20
[52] U.S. Cl. .................. 354/225; 354/54; 354/289
[58] Field of Search .................. 354/219, 224, 225, 53, 354/54, 55, 56, 289, 152, 155

[56] References Cited

U.S. PATENT DOCUMENTS

| 3,387,530 | 6/1968 | Eberty .................. 354/225 |
| 3,996,593 | 12/1976 | Uno et al. .................. 354/56 X |
| 4,015,576 | 4/1977 | Nomura .................. 354/55 |

FOREIGN PATENT DOCUMENTS

| 1,111,811 | 5/1968 | United Kingdom .................. 354/53 |
| 239,796 | 7/1969 | U.S.S.R. .................. 354/152 |

Primary Examiner—Edna M. O'Connor
Attorney, Agent, or Firm—Fitzpatrick, Cella, Harper & Scinto

[57] ABSTRACT

The disclosure describes an indication device in viewfinder for a single lens reflex camera having an exchangeable viewfinder optical system. To improve the exchangeability of the components of the viewfinder optical system, informative members necessary for indicating the information of shutter speed, diaphragm aperture and the like are built in the camera body itself. Among the components of the viewfinder optical system, the condenser lens member and the focusing screen member is enclosed with a frame member to form an unitary viewfinder screen unit. Making use of the space in the unit, a necessary reflective member is fixed to the underside of the condenser lens member. A lighting window is formed on the frame member to direct the information coming from the informative members to the reflective member.

5 Claims, 2 Drawing Figures

INDICATION DEVICE IN VIEWFINDER FOR A SINGLE LENS REFLEX CAMERA

BACKGROUND OF THE INVENTION

1. Field of the Invention

The present invention relates to an indication device in the viewfinder of single lens reflex cameras having a viewfinder optical system comprising a viewfinder element and a viewfinder screen unit removably and exchangeably mounted on the camera body.

2. Description of the Prior Art

Conventionally such an indication device in a viewfinder consists of an informative members unit for indicating information regarding the diaphragm aperture, shutter speed, propriety of exposure and the like, and a reflective member for leading the information into the viewfinder optical system. The informative members unit and the reflective member are placed near or in close proximity to a pentaprism of the viewfinder.

However if the single lens reflex camera has such viewfinder optical system that its viewfinder element and viewfinder screen unit are exchangeable, it is unallowable for reasons of function to build the informative members unit in the viewfinder element or in the viewfinder screen unit.

In this case, the informative members unit must be built in the camera body itself so that the informative members may readily be interlocked with a shutter speed dial, a lens diaphragm or the like associated with the informative members respectively. On the other hand, the reflective member should be arranged in the viewfinder optical system. It is by no means easy to solve the problem in a simple and satisfactory manner.

SUMMARY OF THE INVENTION

Accordingly it is the primary object of the present invention to provide an indication device in a viewfinder adapted for the above mentioned type of single lens reflex camera, which is simple in structure and essentially improves the exchangeability of the components of the viewfinder optical system.

Other and further objects, features and advantages of the invention will appear more fully from the following description.

In summary, the present invention is characterized in that the informative members unit for indicating shutter speed and the like is mounted within the camera body and makes use of the space between a condenser lens and a focusing screen, the reflective member such as prism is fixed directly and indirectly to the underside surface of the condenser lens, and that on a frame member enclosing the viewfinder screen unit there is provided a light transmissive portion (lighting window) to direct the information coming from the informative members unit to the reflective member.

DESCRIPTION OF THE PREFERRED EMBODIMENTS

Figure 1:
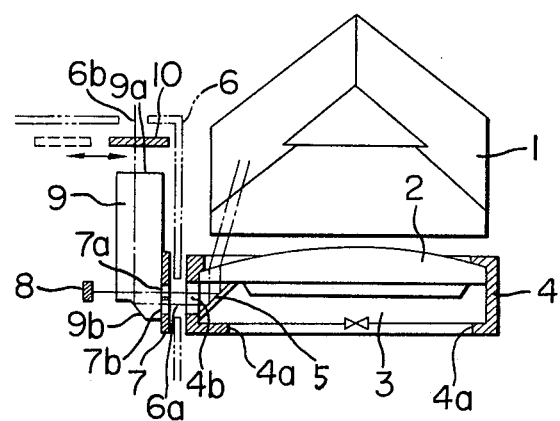
FIG. 1 is a partial sectional fragmentary schematic illustration viewed from the rear side of a camera showing the essential part of the device embodying the present invention.
Figure 2:
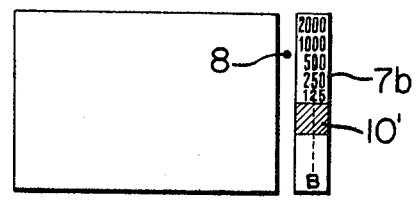
FIG. 2 illustrates the visual field of the viewfinder shown in FIG. 1.

Referring now to FIGS. 1 and 2, there is shown one preferred embodiment of the present invention associated with an electric shutter type of camera. The essential part of the invention is shown in FIG. 1, in sectional view with the exception of a pentaprism 1.

The shown viewfinder optical system is essentially composed of the pentaprism 1, a condenser lens 2 and a focusing screen 3 (in general, Fresnel surface is affixed to the focusing screen 3).

The condenser lens 2 and the focusing screen 3 are united by a frame member 4 to form a unitary viewfinder screen unit. On the underside of the frame member 4, it defines a visual field frame 4a and on the left side (viewed from the plane of drawing) there is formed a lighting window 4b by the light transmissive portion of the frame member.

On the side of the lighting window 4b, the condenser lens 2 and the focusing screen 3 extend further away beyond the visual field than they do on the other side. Therefore, the extension of the viewfinder screen unit beyond the visual field is larger in area on its left hand side than that on the right hand side. At the portion of said left hand side extension outside of the visual field, the condenser lens 2 has a triangular prism 5 fixed to the underside surface of the lens. As seen from FIG. 1, the light incidence surface of the prism 5 coincides, with the opening of the lighting window 4b.

In the drawing of FIG. 1, the phantom line 6 suggests a camera body with which the viewfinder optical system is to be associated. The camera body has a light transmissive portion 6a formed in a position corresponding to said lighting window 4b. Also, in the camera body, there is stationarily arranged an informative members unit for viewfinder, which comprises a shutter speed indication plate 7 and an arrray of luminescence diodes (LED) 8 corresponding to every shutter speed. The shutter speed indication plate 7 has two light transmissive portions 7a and 7b facing the lighting window 4b. The one portion 7a allows the light of the luminescence diode 8 to pass through. On the other portion 7b, a scale of shutter speed is calibrated as shown in FIG. 2. The luminescence diode array is connected to a conventional electric shutter control mechanism (not shown) so that selectively one or two of the diodes may be activated luminously.

A light guide 9 adjacent to the shutter speed indication plate 7 introduces external light into the plate 7 to illuminate the scale portion 7b. Further, a warning sign plate 10 is supported in the camera body in such manner that the plate 10 may be moved between its normal position suggested by the phantom line and its retracted position indicated by the solid line. The warning sign plate 10 is interlocked with a multiple dial for correcting exposure (not shown). In its retracted position, said warning sign plate is interposed between the light incidence surface 9a of the light guide and an external light introducing window 6b so as to give a warning sign for necessary exposure correction.

With this arrangement, the external light introduced from the window 6b comes into the light guide 9 through its light incidence surface 9a and reflects upon its reflection surface 9b. Then the reflected light is directed to the shutter speed scale portion 7b of the plate 7 and after having passed through it, the light passes through the lighting window 4b, and enters into the prism 5 in which the light changes its course to the condenser lens 2, and after passing through the condenser lens 2, the light emerges from the viewfinder screen unit and reaches an eyepiece (not shown).

The light emitted from the luminescence diode 8 goes straight into the light transmissive portion 7a of the shutter speed indication plate 7. After passing through the portion 7a, the light takes the same course as that of the external light, and reaches the eyepiece through the lighting window 4b, the prism 5, the condenser lens 2 of the viewfinder screen unit and then the pentaprism 1.

FIG. 2 illustrates the visual field of the viewfinder viewed through the eyepiece. In the drawing of FIG. 2, a diode 8 is luminously activated and indicates that the shutter speed in this instance is between 1/500 and 1/1000 sec. On the shutter speed scale 7b, there is found also a projection image 10' of the warning sign plate 10 and indicates that the amount of correction for exposure then to be made is 2, 4, -½, -¼ or such other times larger than normal exposures. While the triangular prism is shown as a reflective member, in this embodiment, it is, of course, possible to use any other suitable member such as a mirror.

Furthermore instead of an array of luminescence diodes, other suitable indicating means such as a pointer may be used for shutter speed indication. Otherwise the informative members unit for viewfinder may be designed to make the shutter speed indication scale movable. Also in accordance with the type of camera to which the present invention is applied, there may be employed some other informative members such as ones for indicating the value of diaphragm aperture and/or propriety of exposure.

From the foregoing, it will be appreciated that the arrangment according to the present invention permits an easy and untroubled exchange of viewfinder components. Since the complicate informative members are built in the camera body itself and also the reflective member is mounted within the unit formed by enclosing the condenser lens and the focusing screen with a frame member, the exchange of viewfinder element and/or viewfinder screen unit can be done without damaging the reflective member or without having the exchange hindered by the reflective member. Therefore, the present invention provides a simple arrangement of an indication device in a viewfinder for a camera which has an improved exchangeability of viewfinder element and viewfinder screen unit.

While the invention has been particularly shown and described with reference to one preferred embodiment thereof, it will be understood by those skilled in the art the foregoing and other changes in form and details can be made therein without departing from the scope of the invention.

What is claimed is:

1. A single lens reflex camera comprising:
   an objective lens for receiving light from the object to be photographed;
   a view-finder eyepiece for observing an image of the object;
   a visual field frame provided in the light path from the objective lens to determine a visual field of the view-finder eyepiece.
   a view-finder optical system for guiding light from the objective lens to the view-finder eyepiece, which system includes a focusing screen member provided in the proximity of the visual field frame so that the image of the object may be formed on the focusing screen member; a condenser lens member having an extended portion out of the light path passing through the visual field frame; and a finder member for guiding light from the condenser lens member to the view-finder eyepiece;
   frame means for detachably mounting the view-finder eyepiece and the view-finder optical system onto the camera body;
   information indicating means for indicating exposure information, which means is provided within the camera body; and
   guide means for guiding the information indicated by the information indicating means to the extended portion of the condenser lens member so that the information may be made observable through the view-finder eyepiece.

2. A single lens reflex camera according to claim 1, wherein said guide means includes light transmissive means formed on the camera body for leading the exposure information to the exterior of the camera body; lighting window means formed on said frame means for introducing the exposure information led by the light transmissive means; the light transmissive means and the lighting window means being in opposed relation to each other when the view-finder eyepiece and the view-finder optical system are mounted on the camera body; and
   reflecting means for guiding the exposure information introduced by the lighting window means to the extended portion of the condenser lens member, said reflecting means being detachably mounted to the camera body by said frame means.

3. A single lens reflex camera according to claim 2, wherein said frame means includes a frame member incorporating integrally therewithin at least the focusing screen member, the condenser lens member and the reflecting means.

4. A single lens reflex camera according to claim 3, wherein said reflecting means is provided between said focusing screen member and said condenser lens member.

5. A single lens reflex camera according to claim 2, wherein said information indicating means are provided adjacent to said light transmissive means for indicating said exposure information; and means are provided for illuminating said indicating member.

* * * * *